No. 844,806. PATENTED FEB. 19, 1907.
I. C. JONES.
BRICK DRIER.
APPLICATION FILED OCT. 29, 1906.

3 SHEETS—SHEET 1.

WITNESSES
A. M. Wahlstrom
J. B. Era

INVENTOR
IRA C. JONES
BY Paul & Paul
HIS ATTORNEYS

No. 844,806. PATENTED FEB. 19, 1907.
I. C. JONES.
BRICK DRIER.
APPLICATION FILED OCT. 29, 1906.

3 SHEETS—SHEET 3.

WITNESSES
A. M. Walstrom
J. B. Era

INVENTOR
IRA C. JONES
BY Paul & Paul
HIS ATTORNEYS

UNITED STATES PATENT OFFICE.

IRA C. JONES, OF MINNEAPOLIS, MINNESOTA, ASSIGNOR TO MINNEAPOLIS BRICK & TILE CO., OF MINNEAPOLIS, MINNESOTA.

BRICK-DRIER.

No. 844,806.　　　　Specification of Letters Patent.　　　　Patented Feb. 19, 1907.

Application filed October 29, 1906. Serial No. 340,950.

*To all whom it may concern:*

Be it known that I, IRA C. JONES, of Minneapolis, Hennepin county, Minnesota, have invented certain new and useful Improvements in Brick-Driers, of which the following is a specification.

The object of my invention is to provide means for automatically picking up pallets of brick from a suitable carrier and delivering them to the different levels of a drier.

A further object is to provide a brick-drier adapted to receive the pallets of brick and discharge them without any attention on the part of the operator, except to set the gravity carrier in position to receive or deliver the pallets at the different levels.

The invention consists generally in various constructions and combinations, all as hereinafter described, and particularly pointed out in the claims.

Figure 1:
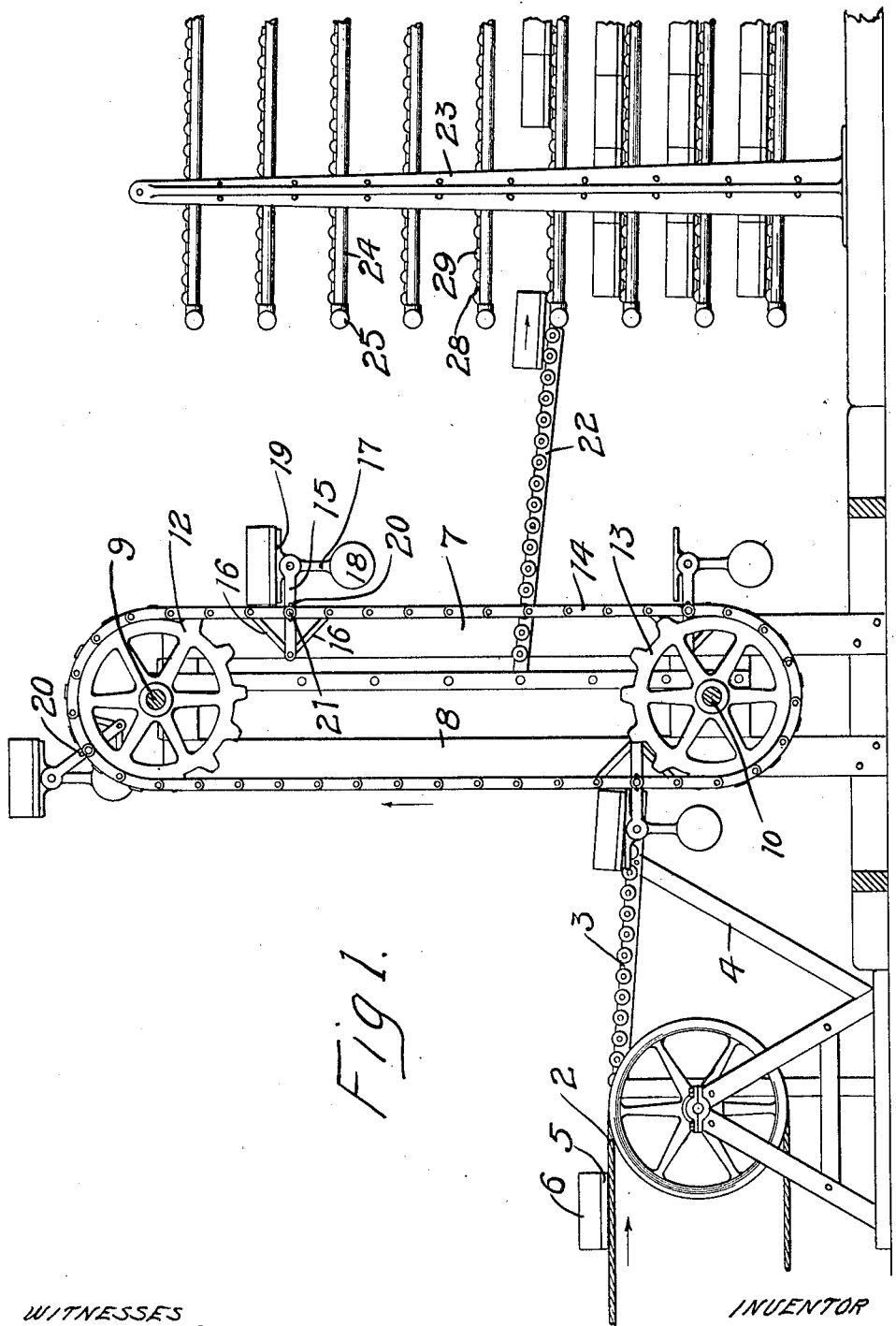
Figure 2:
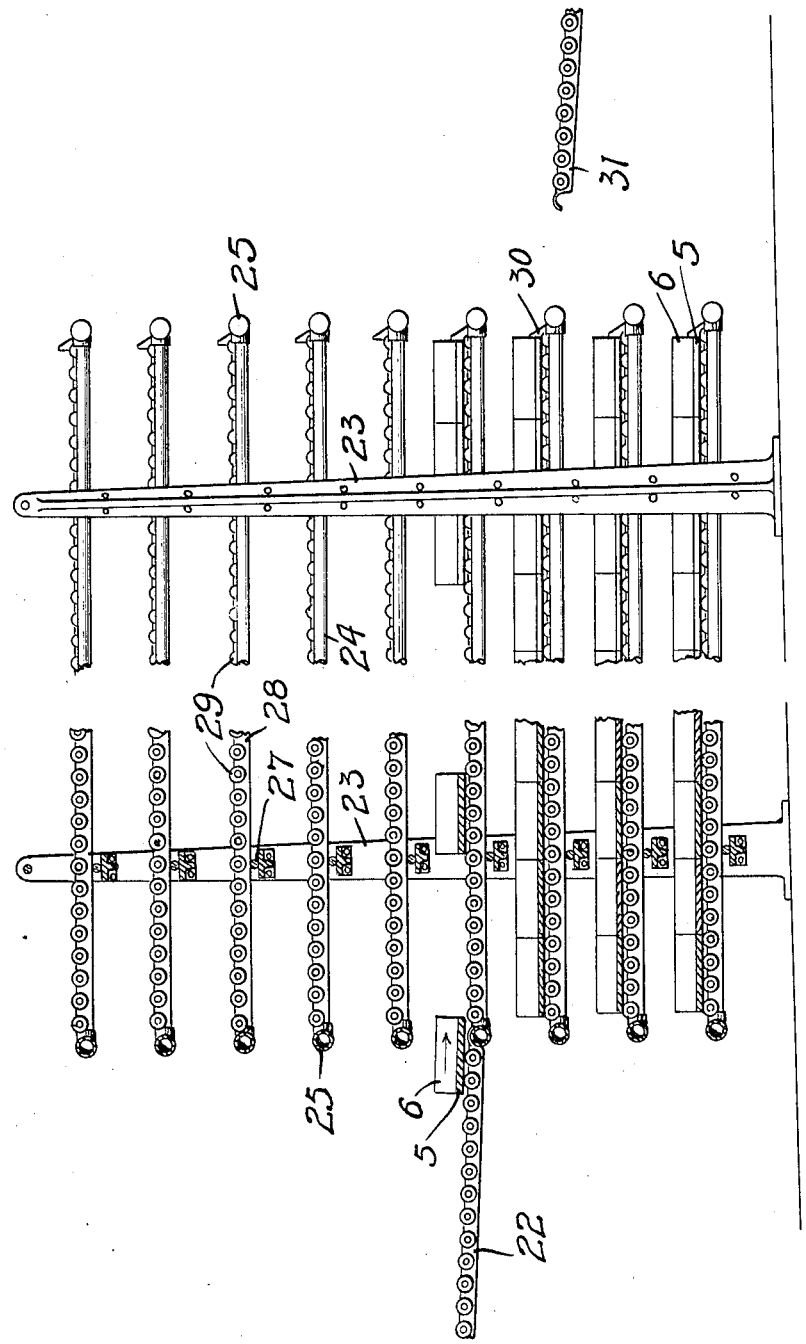
Figure 3:
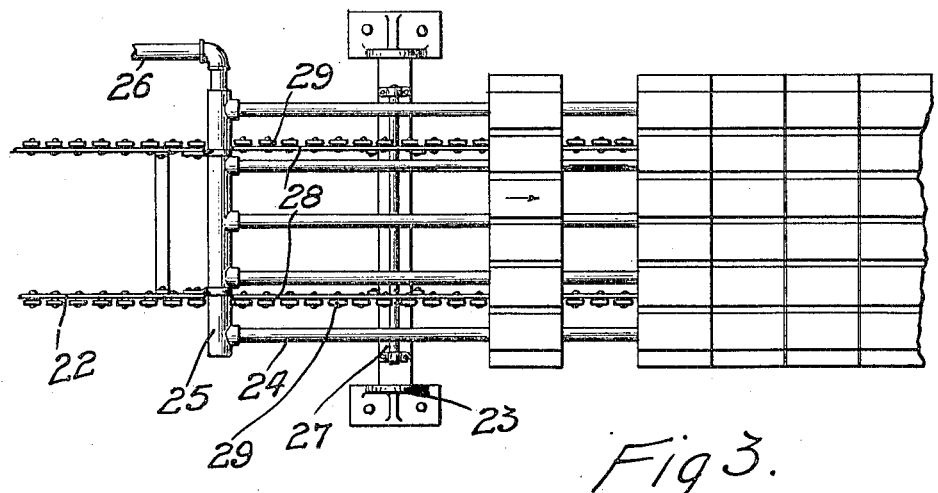
Figure 4:
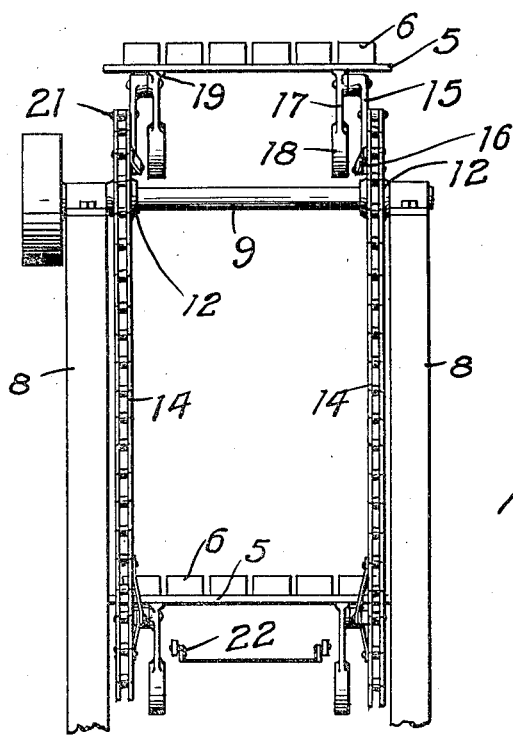

In the accompanying drawings, forming part of this specification, Figure 1 is a side elevation of one end of a drier, showing the means for delivering the pallets of brick thereto. Fig. 2 is a similar view, partially in section, showing the receiving and discharging ends of the drier. Fig. 3 is a plan view of a section of the drier. Fig. 4 is a detail view of the elevating device, showing the mechanism mounted thereon for picking up the brick-pallets.

In the drawings, 2 represents an ordinary cable conveyer now generally used in brick-yards for the purpose of transporting pallets of brick from the machine to the drier. At the discharge end of this conveyer I provide a gravity-carrier 3, supported on a suitable frame 4 in position to receive the pallets 5, loaded with brick 6, as they are brought along by the cable. At the discharge end of the carrier 3 I provide upright timbers 7 and 8, wherein shafts 9 and 10 are journaled. Sprockets 12 and 13 are mounted on these shafts in pairs one above another, the upper and lower sprockets of the same pair being connected by sprocket-chains 14. A belt might be used in place of the chains. Bars 15 are connected at points intermediate to their ends to said sprocket-chains, and the inner ends of the bars are attached to said chains by links 16. The outer ends of the bars project a suitable distance beyond the chains, and arms 17 are pivoted thereon, having weighted lower ends 18 and flat bearing-surfaces 19 at their upper ends that are arranged to pass up between the discharge end of the carrier 3 and pick up the pallet loaded with brick thereon. The arms as they ascend will hang vertically, the weighted lower ends causing them to remain in their plumb position while passing up over the sprockets at the top of the elevator and also while descending on the other side.

I provide slots 20 in the arms 15, through which the pivots 21 pass, that secure the said arms to the chains, and this slotted connection allows a slight longitudinal movement of the bars while making the turn at the ends of the elevator. This slight movement of the bars I have found to be necessary to insure the free and uncramped swinging movement of the pallet-carriers at the top and bottom. Any suitable number of these pallet-carriers may be provided. I have shown, however, four of them, arranged to pick up the pallets on one side, carry them over on the other side of the elevator, and deposit them at any desired level. A carrier-section 22, similar to the one on the receiving side of the elevator, will be provided on the down side, having one end in position to allow the passage of the pallet-carriers between its rails, so that as the carrier descends it will leave its pallet on the antifriction-wheels of the gravity-carrier, while the opposite end of the carrier is supported by the end of the drier.

This drying apparatus may be made of any preferred style. I have shown in this case, however, upright standards 23 and coils of pipe 24, connected to heads 25, having a steam-supply pipe 26. Cross-rods 27 connect the standards at different levels and support the horizontal pipes of the drier. The pipes are made of any suitable length and are inclined slightly from their receiving toward their discharge end, and rails 28, having antifriction-wheels 29 mounted thereon, are arranged between the pipes of the drier and extend slightly above the same to form an antifriction bearing-surface, over which the loaded pallets will slide automatically from the receiving to the discharge end of the drier. Suitable stops 30 are provided at the discharge end to check further movement of the pallets, and when these stops are removed the pallets may be discharged over a gravity-carrier 31 to the kiln. It will not be even necessary to handle the pallets in discharging them from the drier, for as soon as the stops or obstructions are removed and the gravity-carrier put in place the pallets will begin to slide down thereover and be transported to the kiln located at a convenient distance. A brick-drier can thus be loaded and unloaded without the necessity of handling the pallets, and a large saving in time and labor is thus effected.

I claim as my invention—

1. The combination, with a conveyer, of a gravity-carrier provided at the discharge end thereof in position to receive the loaded brick-pallets, an elevator arranged at the discharge end of said gravity-carrier and having pivoted carriers arranged to pick up the loaded pallets, a second gravity-carrier on the down side of said elevator and whereto the loaded pallets are delivered by said elevator and a steam-drier composed of an upright frame and a series of steam-coils supported at different levels in said frame and having antifriction-wheels projecting above the tops of said coils and whereon the loaded pallets are discharged from said second gravity-carrier, substantially as described.

2. The combination, with a conveyer, of an elevator arranged at the discharge end of said conveyer and comprising shafts and sprocket-gears mounted thereon and sprocket-chains connecting the upper and lower gears, pallet-carriers pivoted on said chains and having weighted lower ends and adapted to pick up the loaded pallets from the discharge end of said conveyer, a gravity-carrier provided on the down side of said elevator and adapted to receive the loaded pallets from said carriers and a brick-drier composed of coils of steam-pipes arranged on different levels and having antifriction bearing-wheels projecting above said pipes and upon which bearing-wheels the loaded pallets are deposited by said gravity-carrier, substantially as described.

3. The combination, with a conveyer, of an elevator arranged at the discharge end thereof and having pivoted carriers arranged to pick up the loaded brick-pallets from said conveyer, a gravity-carrier on the down side of said elevator and whereto the loaded pallets are delivered by said elevator, and a steam-drier composed of an upright frame and a series of steam-coils supported at different levels in said frame and having antifriction-wheels projecting above the tops of said coils and whereon the loaded pallets are discharged from said gravity-carrier, substantially as described.

4. The combination, with a conveyer, of an elevator comprising belts operating vertically side by side, bars having sliding pivotal connections with said belts, links connecting the inner ends of said bars with said belts, pallet-carriers having weighted lower ends pivoted on said bars and adapted to pick up a loaded brick-pallet from said conveyer, a gravity-carrier provided on the down side of said elevator and whereto the loaded pallets are delivered, and a drier arranged to receive the pallet from said gravity-carrier.

In witness whereof I have hereunto set my hand this 24th day of October, 1906.

IRA C. JONES.

Witnesses:
RICHARD PAUL,
J. B. ERA.